Figures 1, 2:
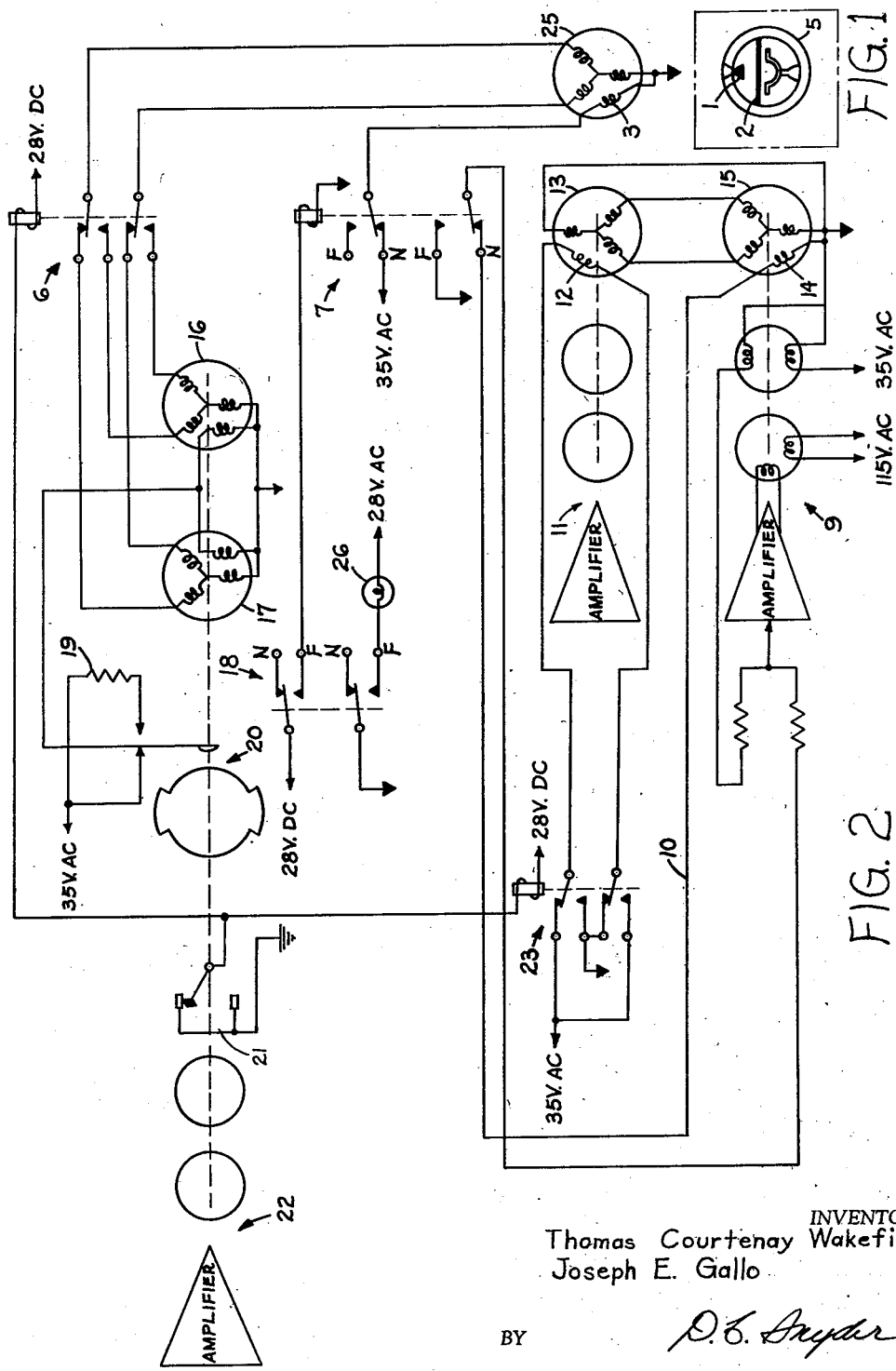

INVENTORS
Thomas Courtenay Wakefield
Joseph E. Gallo
ATTORNEY

United States Patent Office 2,793,445
Patented May 28, 1957

2,793,445
GYRO SIMULATOR

Thomas Courtenay Wakefield, Denville, and Joseph E. Gallo, Livingston, N. J., assignors, by mesne assignments, to the United States of America as represented by the Secretary of the Navy Application October 24, 1952, Serial No. 316,816

11 Claims. (Cl. 35—12)

This invention relates to grounded training apparatus used for instruction of student pilots in the flight of aircraft and more specifically to improvements in means for controlling the artificial horizon (pitch) and roll angle (bank) indicators in the attitude gyro of the flight trainer.

The attitude gyro is an instrument designed to indicate simultaneously the pitch angle and roll angle of an aircraft. In the aircraft the instrument is controlled by a gyroscope revolving in a plane which remains practically stationary regardless of motion of the aircraft. In flight trainers, however, it is more convenient to maintain the fuselage and student pilot in stationary positions and provide simulated artificial horizon and roll angle indications as governed by computers which in turn react to movements of the trainer controls by the student pilot or the instructor.

In particular, the type H–3 attitude gyro provides both artificial horizon and roll angle indications independently through control of a separate rotatable shaft coupled to each indicator. It has been customary, as evidenced by the prior art, to control these shafts either mechanically through the operation of gear trains, cams, wire lines, etc., or electrically through the operation of motors, or both conjunctionally. An example of such a trainer gyro may be found in Patent No. 2,578,177, dated December 11, 1951, and granted to R. C. Dehmel.

It is the general object of this invention to provide equipment and circuitry illustrating an improved method of control of the artificial horizon and roll angle shafts, arranged for this purpose as rotors of separate synchro receivers. More particularly, this disclosure presents means of translating the outputs of the pitch and bank computers of the flight trainer into motion of the attitude gyro artificial horizon and roll angle indicators, simulating the motion of these indicators in the type H–3 attitude gyro of an aircraft.

Additionally, the type H–3 atttiude gyro is provided with stops which prevent further motion of the artificial horizon indicator when the simulated climb or dive of the trainer represents aircraft motion which deviates from horizontal or normal flight by pitch angles of from 27 to 153 degrees and from 207 to 333 degrees. A further object of this invention is to provide means of protecting the equipment and circuitry which activate the indicator when the computers of the flight trainer simulate these angles of flight.

A further object of this invention is to provide equipment for and a method of indicating simulated inverted flight of the aircraft.

A still further object of this invention is to provide means for simulating failure in the indicators of the type H–3 attitude gyro.

Other objects and many of the attendant advantages of this invention will be readily appreciated as the same becomes better understood by reference to the following detailed description when considered in connection with the accompanying drawings wherein:

Fig. 1 presents the face of the flight trainer attitude gyro as seen by the student pilot. Fig. 2 is a schematic diagram presenting equipment and circuitry to illustrate one embodiment of the method herein disclosed to provide type H–3 attitude gyro indications. The following parts list will expedite a study of the drawings:

| Part Number | Element |
|---|---|
| 1 | bank indicator. |
| 2 | pitch indicator. |
| 3 | pitch indicator rotor. |
| 5 | attitude gyro. |
| 6 | pitch reversal relay. |
| 7 | failure relay. |
| 9 | feedback servo system. |
| 10 | bank computer servo system feedback path. |
| 11 | bank servo system. |
| 12 | bank indicator rotor. |
| 13 | bank synchro. |
| 14 | bank control rotor. |
| 15 | bank control synchro. |
| 16 | pitch transmitting synchro. |
| 17 | Do. |
| 18 | failure switch. |
| 19 | pitch protective resistor. |
| 20 | pitch cam switch. |
| 21 | pitch reversal switch. |
| 22 | pitch computer servo system. |
| 23 | bank reversal relay. |
| 25 | pitch receiving synchro. |
| 26 | failure indicator lamp. |

Referring to Fig. 1, the roll angle (bank) indicator 1 is seen as a dark isosceles trapezoid at the periphery of the instrument face of the type H–3 attitude gyro 5. This indicator assumes a position on the circumference in accordance with simulated bank of the trainer and is shown in Fig. 1 as simulating zero roll angle. The horizon (pitch) indicator 2 is seen as a straight dark line traversing the face of the instrument and assumes a position in accordance with simulated pitch of the trainer; it is shown in Fig. 1 as simulating a condition of dive. The indicators 1 and 2 are connected to shafts which are part of synchro receiver rotors 12 and 3, respectively and are thus governed by the motion of these rotors.

Referring now to Fig. 2, the source of motion for the pitch indicator rotor 3 is the pitch computer servo system 22 to which is coupled the slider contact of switch 21, a cam switch 20 and the rotors of two transmitting synchros, 16 and 17. Transmitting synchro 16 is wired and aligned to pitch receiving synchro 25 at zero degrees of pitch and pitch transmitting synchro 17 is similarly wired and aligned to pitch receiving synchro 25 but at 180 degrees of pitch. Thus, pitch transmitting synchro 16 causes operation of pitch indicator rotor 3 in one direction while pitch transmitting synchro 17 causes rotation in the opposite direction. The transfer from one to the other of synchros 16 and 17 occurs in this application at pitch angles of 90 degrees and 270 degrees through the operation of pitch reversal relay 6, the coil of which is energized in accordance with the mechanical position of the slider of switch 21. Thus, the direction and degree of rotation of the pitch indicator 2 are both controlled by the output of the pitch computer servo system 22. Additionally, since the pitch indicator rotor 3 reaches mechanical stops in the H–3 gyro indicator and is stalled for pitch angles between 27 degrees to 153 degrees and between 207 degrees to 333 degrees, to preclude oscillation of pitch indicator rotor 3 and possible overheating of its windings, for these ranges of pitch angle, drive for pitch indicator rotor 3 is interrupted by the insertion of a protective resistor 19 in series with the synchro power supply to the rotors of transmitting synchros 16 and 17 by means of pitch cam switch 20, also mechanically coupled to pitch computer servo system 22.

The source of motion for the bank indicator rotor 12 is the feedback servo system 9, herein indicated as a feedback generator servo system, which operates to control one input to a differential servo system consisting of synchros 13 and 15 through rotation of rotor 12. The degree of rotation of the receiver bank indicator rotor 14 is in this way under the control of both the bank servo system 11 and the feedback servo system 9, the latter of which is provided to increase the system driving power. Further, the position of the roll angle indicator 1 may be shifted instantaneously to the lower half of the periphery of the attitude gyro 5 by reversing the polarity of the energizing voltage supply of bank indicator rotor 12 through the action of bank reversal relay 23, the energizing of the coil of which is controlled by the arm of switch 21. Such reversal occurs at pitch angles of 90 degrees and 270 degrees and in this way provides simulation of inversion of the aircraft.

Other equipment of Fig. 2 is devoted to the simulation of failure of the indicators of the attitude gyro 5. Switch 18 is a failure switch located at the instructor's bench of the flight trainer. Operation of failure switch 18 illuminates failure indicator lamp 26 and supplies energizing voltage to the coil of failure relay 7. Contacts on failure relay 7 provide horizon indication failure by open circuiting power to the pitch indicator rotor 3. A second set of contacts on failure relay 7 provides roll indication failure by opening the ungrounded terminal of bank control rotor 14 to interrupt path 10 of bank computer servo system 9.

The operation of the means herein presented for controlling the pitch and bank indicators in the H-3 attitude gyro simulator of a flight trainer will now be described in connection with a representative aerobatic maneuver, the inside loop.

For the maneuver, the aircraft type H-3 attitude gyro gives indications as follows: As the aircraft nose starts up from zero pitch, the horizon indicator moves down until the aircraft reaches a pitch angle of approximately 27 degrees. At this angle the horizon indicator reaches a stop in the attitude gyro and is just visible at the bottom of the face of the gyro. The horizon indicator remains in this position until the aircraft approaches a pitch angle of 90 degrees at which time the attitude gyro rotates 180 degrees and shows the roll angle indicator at the bottom of the face with the horizon indicator at the top; the aircraft is now in inverted flight. This indication is maintained until a pitch angle of 153 degrees is reached. From a pitch angle of 153 degrees to an angle of 207 degrees, the horizon indicator moves down across the face of the attitude gyro until it hits the stop at the bottom. At 270 degrees, the procedure that occurred at 90 degrees is repeated in reverse so that the roll angle indicator is again positioned at the top. At a pitch angle of 333 degrees, the horizon indicator moves down from the stop and at the completion of the loop, has returned to its position for normal flight.

The action of the apparatus shown in Fig. 1 in simulation of this maneuver is as follows: The student operates his controls to simulate aircraft climb, thus activating pitch computer servo system 22 which rotates the arm of switch 21, cam switch 20 and the rotors of pitch transmitting synchros 16 and 17. The arm of switch 21 has already selected the stator of pitch transmitting synchro 16 or 17 through operation of pitch reversal relay 6, as determined by the simulated pitch position alignment of the stators. The pitch indicator rotor 3 follows the movement of the appropriate pitch transmitting rotor. As climb reaches 90 degrees or 270 degrees, the arm of switch 21 causes transfer between the pitch transmitting synchros as previously discussed. To simulate the stall of the pitch indicator 2 for pitch angles between 27 degrees to 153 degrees and 207 degrees and 333 degrees, cam switch 20 has inserted the protective resistor in series with the rotors of pitch transmitting synchros 16 and 17. Simultaneously, as pitch angles of 90 degrees and 270 degrees are reached, the arm of switch 21 has reversed the direction of rotation of the winding of bank indicator rotor 12 thus instantaneously shifting the bank indicator to the opposite side of the attitude gyro. Thus, perfect simulation of an aircraft attitude gyro is obtained.

Obviously many modifications and variations of the present invention are possible in the light of the above teachings. It is therefore to be understood that within the scope of the appended claims the invention may be practiced otherwise than as specifically described.

What is claimed is:

1. Equipment for control of the artificial horizon and roll angle indicators of the attitude gyro simulator of training apparatus for student pilots; comprising a pitch computer, a pitch servo system coupled to said pitch computer, an artificial horizon indicator coupled to said pitch servo system, means for selecting the direction of rotation of the artificial horizon indicator, means for incapacitating the artificial horizon indication at predetermined intervals, a bank computer, a bank servo system coupled to said bank computer, a roll angle indicator coupled to said bank servo system, means for abruptly reversing the position of the roll angle indicator at predetermined intervals, and means for introducing failure symptoms in the artificial horizon and roll angle indications.

2. Equipment for control of the artificial horizon and roll angle indicators of the attitude gyro simulator of training apparatus for student flight personnel comprising means operated by an arm coupled to the pitch computer of the apparatus arranged to select alternately one or two servo systems also coupled to the pitch computer, said servo systems wired and aligned to produce opposite rotations of the artificial horizon indicator, means for incapacitating the artificial horizon indication at predetermined intervals, a bank computer, a bank servo system coupled to said bank computer, a roll angle indicator coupled to said bank servo system, means also operated by the arm coupled to the pitch computer arranged to interchange the connections between the rotor of the transmitting synchro of the roll angle indicator servo system and its power supply, and means for introducing failure symptoms in the artificial horizon and roll angle indications.

3. Equipment for control of the artificial horizon and roll angle indicators of the attitude gyro simulator of training apparatus for student flight personnel, comprising a pitch computer, a pitch servo system coupled to said pitch computer, an artificial horizon indicator coupled to said pitch servo system, means for selecting the direction of rotation of the artificial horizon indicator, means for incapacitating the artificial horizon indication at predetermined intervals, a bank computer, a bank servo system coupled to said bank computer, a roll angle indicator coupled to said bank servo system, means for abruptly reversing the position of the roll angle indicator at predetermined intervals, and means for remotely introducing and controlling failure in the horizon and roll angle indicators of the attitude gyro simulator through interruption of the power circuit of the rotor of the receiving synchro of the horizon indicator servo system and also by inactivating the bank computer servo system.

4. Equipment for control of the artificial horizon and roll angle indicators of the attitude gyro simulator of grounded training apparatus for student pilots, a relay operated by means of a switch arm mechanically coupled to the pitch computer of the apparatus, said relay containing switch contacts arranged to select alternately one of two servo systems also coupled to the pitch computer and arranged to produce opposite rotations of the artificial horizon indicator, a switch operated by a rotating cam coupled to the pitch computer, said switch arranged to insert a de-energizing resistor in the power circuit of the rotors of the transmitting synchros of the artificial horizon indicator servo system as predetermined by the cutout portions of the cam, a second relay also operated by means of the aforementioned switch arm, said relay containing switch contacts arranged to reverse the polarity of the power supplied to the rotor of the transmitting synchro of the roll angle indicator servo system, and a switch-controlled relay containing contacts arranged to open the power circuit of the rotor of the receiving synchro of the horizon indicator servo system while simultaneously inactivating the bank receiver servo system.

5. In a simulated attitude gyro indicating system for a flight personnel trainer comprising an artificial horizon indicator and a roll angle indicator, means for actuating the horizon indicator comprising a plurality of transmitting servos 180 degrees out of phase and means for actuating the roll angle indicator comprising a differential servo system.

6. Equipment for control of the artificial horizon and roll angle indicators of the attitude gyro simulator of training apparatus for student flight personnel, comprising a pitch computer servo system, two servos electrically one hundred and eighty degrees apart coupled to said pitch computer servo system, an artificial horizon indicator comprising a receiving servo coupled to said pitch servo system, means for selecting the direction of movement of the artificial horizon indicator, a bank computer servo system, a roll angle indicator comprising a receiving servo coupled to said bank servo system, means for abruptly reversing the position of the roll angle indicator at predetermined intervals, means for remotely introducing failure in the horizon and roll angle indicators of the attitude gyro simulator comprising means to interrupt the power circuit of the rotor of the receiving servo of the horizon indicator, and means for inactivating the receiving servo of the roll angle indicator.

7. Equipment for control of the artificial horizon and roll angle indicators of the attitude gyro simulator of training apparatus for student flight personnel, comprising a pitch computer servo system, two servos that are electrically one hundred and eighty degrees apart coupled to said pitch computer servo system, an artificial horizon indicator coupled to said pitch servo system, means for selecting the direction of movement of the artificial horizon indicator, a bank computer servo system, a roll angle indicator coupled to said bank servo system, and means for abruptly reversing the position of the roll angle indicator at predetermined intervals.

8. A simulated attitude gyro indicating system for a flight personnel trainer comprising an artificial horizon indicator, switching means, and two transmitting servos 180 degrees out of phase coupled selectively to said indicator through said switching means to simulate normal or inverted flight.

9. The combination of claim 8 further comprising means to incapacitate said indicator.

10. A simulated attitude gyro indicating system for a flight personnel trainer comprising a roll angle indicator, switching means, and a differential servo system coupled selectively to said indicator through said switching means to simulate normal or inverted flight.

11. The combination of claim 10 further comprising means to incapacitate said indicator.

References Cited in the file of this patent
UNITED STATES PATENTS

| Number | Name | Date |
|---|---|---|
| 2,366,603 | Dehmel | Jan. 2, 1945 |
| 2,381,872 | Baker | Aug. 14, 1945 |
| 2,472,888 | Cunningham | June 14, 1949 |
| 2,485,286 | Hayes | Oct. 18, 1949 |
| 2,485,293 | Kail | Oct. 18, 1949 |
| 2,519,698 | Pearsall | Aug. 22, 1950 |
| 2,578,177 | Dehmel | Dec. 11, 1951 |
| 2,628,434 | Dehmel | Feb. 17, 1953 |